DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 11, 1971

886 O.G. 215

T886,014
GELATIN WITH IMPROVED CHEMICAL SETTING PROPERTIES

Thomas Karl Dykstra, % Eastman Kodak Co., Kodak Park Division, Rochester, N.Y. 14650

Filed Aug. 3, 1970, Ser. No. 60,710
**Int. Cl. G03c *1/02***
U.S. Cl. 96—114.8
No Drawing. 19 Pages Specification

Gelatin, modified by reacting it with diketene and thereafter with a suitable aldehyde, like formaldehyde, possesses desirable properties including ultra-rapid chemical setting. Particularly effective modified gelatin comprises less than all, and preferably up to about 50% of its primary amine functions converted to its acetoacetamido function and photographic emulsions and layers comprising said modified gelatin are useful in photography and in rapid coating of multilayer elements.

Silver halide emulsions and elements containing said modified gelatin can be chemically sensitized. e.g. with noble metal sensitizers alone or in combination with sulfur or selenium sensitizers. They can contain spectral sensitizers, incorporated color-forming couplers, incorporated developing agents, antifoggants, hardeners, plasticizers, coating aids, vinyl polymers, and other suitable photographic addenda such as described in U.S. Pat. 3,297,446 of Dunn issued Jan. 10, 1967 (columns 4 to 9).